US011738596B2

(12) United States Patent
Langenfeld

(10) Patent No.: US 11,738,596 B2
(45) Date of Patent: Aug. 29, 2023

(54) APPARATUS FOR SPRING CENTERED CASTER WHEEL

(71) Applicant: DEKA Products Limited Partnership, Manchester, NH (US)

(72) Inventor: Christopher C. Langenfeld, Nashua, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 180 days.

(21) Appl. No.: 17/005,408

(22) Filed: Aug. 28, 2020

(65) Prior Publication Data

US 2021/0061004 A1   Mar. 4, 2021

Related U.S. Application Data

(60) Provisional application No. 62/893,267, filed on Aug. 29, 2019.

(51) Int. Cl.
*B60B 33/06* (2006.01)
*B60B 33/00* (2006.01)
*B60P 3/00* (2006.01)

(52) U.S. Cl.
CPC ........ *B60B 33/066* (2013.01); *B60B 33/0021* (2013.01); *B60B 33/0049* (2013.01); *B60P 3/00* (2013.01); *B60P 3/007* (2013.01)

(58) Field of Classification Search
CPC .............. B60B 33/066; B60B 33/0021; B60B 33/0049; B60B 33/045; B60P 3/00; B60P 3/007
See application file for complete search history.

(56) References Cited

U.S. PATENT DOCUMENTS

| 4,010,636 | A | * | 3/1977 | Clark | G21C 17/007 376/249 |
| 11,219,165 | B1 | * | 1/2022 | Meng | B62D 15/025 |
| 2019/0031222 | A1 | * | 1/2019 | Takyar | B65D 19/0095 |
| 2019/0046373 | A1 | * | 2/2019 | Coulter | H04L 9/3215 |
| 2021/0031561 | A1 | * | 2/2021 | Langenfeld | G05D 1/0231 |
| 2022/0097588 | A1 | * | 3/2022 | Ulsamer | B66C 1/36 |
| 2022/0378632 | A1 | * | 12/2022 | Coulter | A61G 5/063 |

* cited by examiner

*Primary Examiner* — Kevin Hurley
*Assistant Examiner* — Marlon A Arce
(74) *Attorney, Agent, or Firm* — William A. Bonk, III

(57) ABSTRACT

An autonomous delivery vehicle having one or more caster wheels that may be held off the ground for a portion of the time that the autonomous delivery vehicle travels. Each caster wheel is mounted in a pivot with a centering mechanism to hold the caster wheels in a design orientation. The caster wheel in the design orientation maximizes the view of forward-looking sensors on the autonomous delivery vehicle. The centering mechanism uses a compression spring that drives a follower and swashshaft to apply a rotation force on the caster wheels. The rotational force urges the casters frame and wheels to return to a design position. The rotational force increases with the rotational difference between the caster rotational position and the design position.

13 Claims, 7 Drawing Sheets

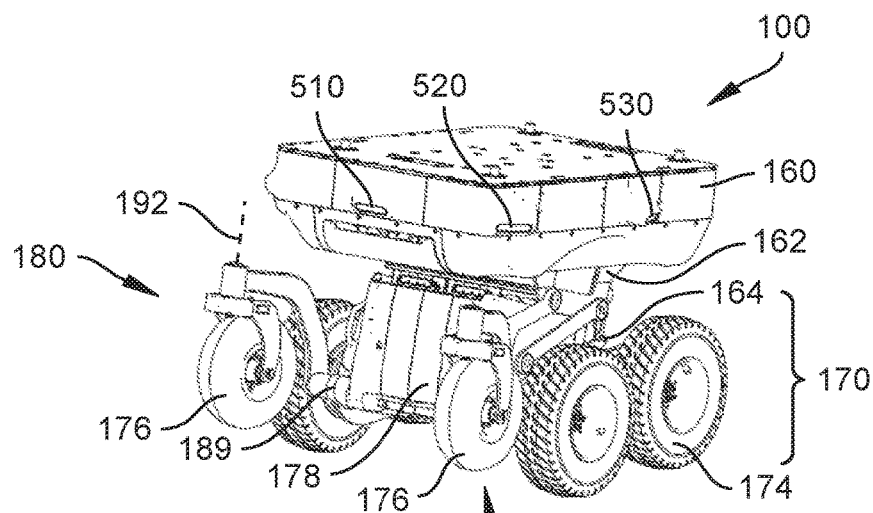
FIG. 1
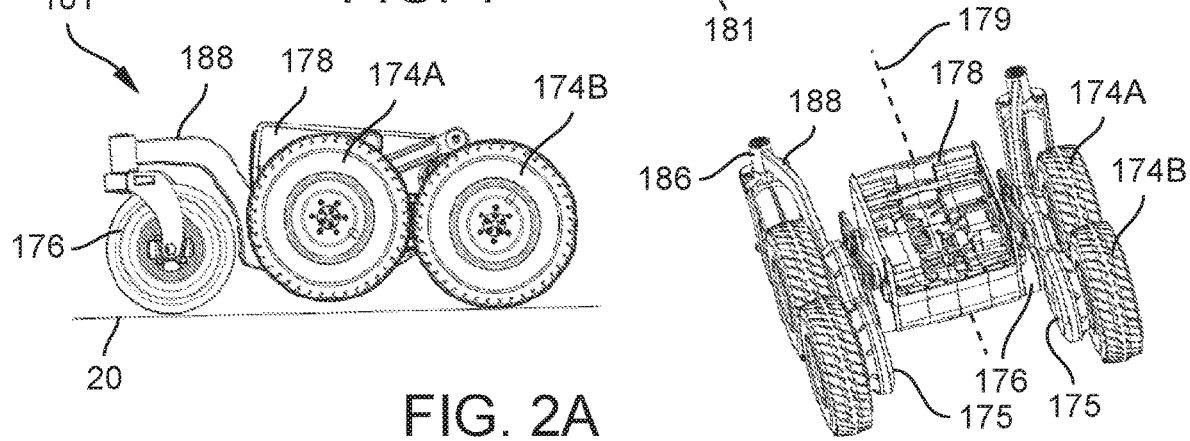
FIG. 2A
FIG. 2B
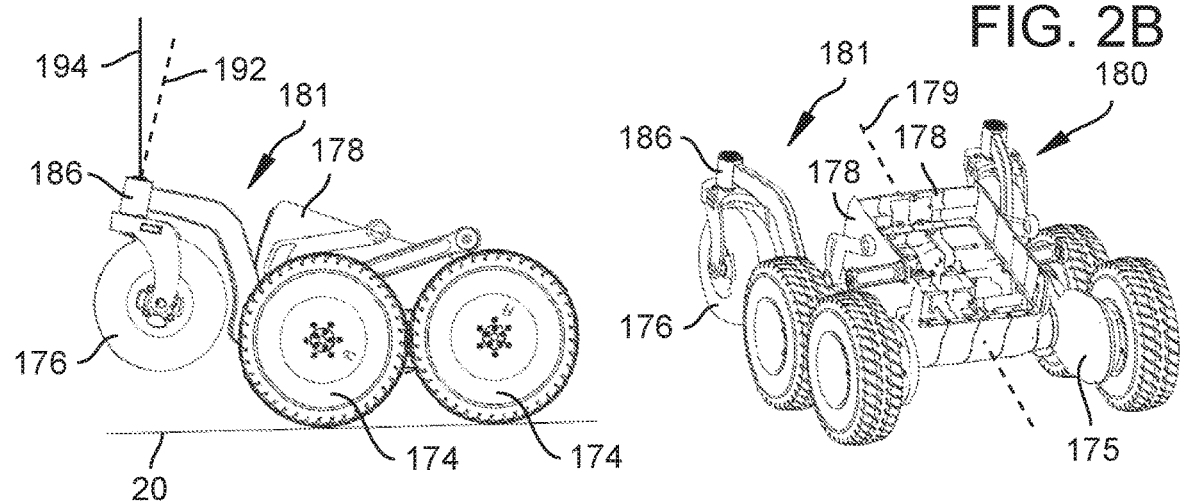
FIG. 2C
FIG. 2D

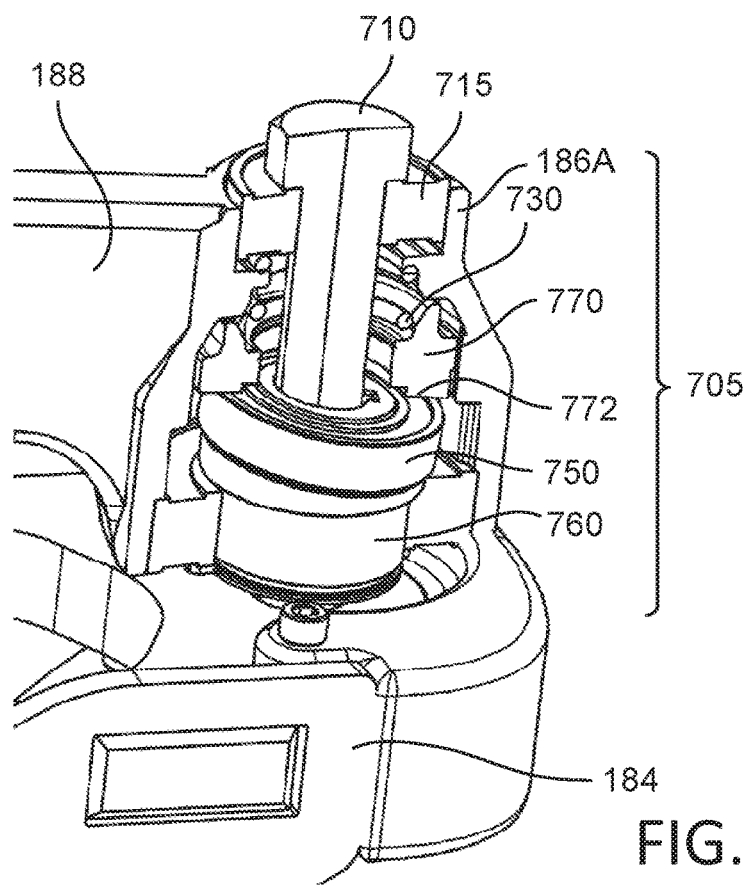
FIG. 10A
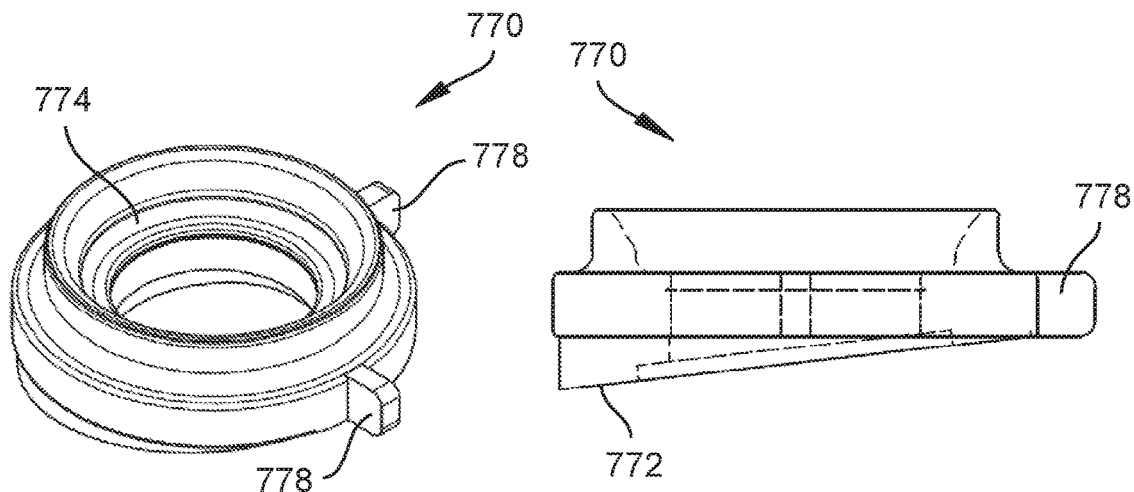
FIG. 10B
FIG. 10C

APPARATUS FOR SPRING CENTERED CASTER WHEEL

CROSS REFERENCE TO RELATED APPLICATIONS

The present application is a Non-Provisional application which claims priority from U.S. Provisional Patent Application Ser. No. 62/893,267, filed Aug. 29, 2019 and entitled Apparatus for Spring Caster Wheel, which is hereby incorporated herein by reference in its entirety.

BACKGROUND

The present teachings relate generally to autonomous delivery vehicles, and more specifically to the control of the casters wheels not in contact with the ground. Autonomous Delivery Vehicles (ADV) may securely deliver one or more packages or items to a desired location. The ADV needs to orient itself within its environment and navigate the streets, sidewalks, and open spaces to reach a desired destination. In addition, the ADV needs to identify and avoid obstacles and recognize changes in travel surface. Obstacle and/or surface detection relies on short range sensors include stereo-cameras, short-range radar, ultra-sonic etc. These short range sensors typically observe the area or volume around the ADV out to several meters. In order to improve obstacle/surface detection, the movement of ADV components within the field of view of the short-range sensors should be limited. Swivel casters rotate or pivot about an axis approximately perpendicular to the wheel axis. The pivoting of the swivel casters allows the caster wheel contacting the ground to align with the direction of travel. In cases, where the swivel caster is lifted off the ground, the caster may pivot freely and move within the FOV of the front and corner short-range sensors. There is a need for an apparatus to encourage the swivel casters to hold a desired orientation relative to the ADV.

SUMMARY

Briefly, and in general terms, the present disclosure relates to an apparatus to controlling the rotational position of a caster on a vehicle. The apparatus consists of a first part mounted to a base of the vehicle, a second part rotatably mounted within the first part and a spring actuator that acts on the first and second parts. The second part rotates about a castor pivot axis is characterized by it's rotational position with respect to the first part. The second part has a design rotational position with respect to the first part. The spring actuator that applies a force on the second part that increases with an angular difference between the rotational position and the design position of the second part.

The spring actuator includes a compression spring oriented along the castor pivot axis, a swashshaft attached to the second part and a follower to contacts the spring and the swashshaft. The swashshaft including a bearing surface characterized by swashshaft axis that intersects the caster pivot axis at an acute angle and the bearing surface is centered on the swashshaft axis. The follower is driven by the swashshaft and progressively compresses the compression spring as the angular difference increases. In an embodiment the follower is rotatably connected to the first part via a pin that is perpendicular to the castor pivot axis. In another embodiment, the follower is allowed to move axially and is constrained by the first part from rotating about the caster pivot axis. The follower has a first surface, surface in contact with the bearing surface, so that the first surface is perpendicular to the swashshaft axis when the second part is in the design position.

In some embodiments, the second part includes a kingpin, which is kingpin rigidly attached to the swashshaft. The design position aligns the caster frame with a centerline of the vehicle base.

In some embodiments, the swashshaft includes a fixed portion attached to the second part and a bearing portion that includes the bearing surface. The bearing portion may be a roller element bearing with an outer race. The outer race may be the only part of the swashshaft that contacts the follower. The second part may include a caster fork and a caster wheel, where the caster wheel is rotatably attached to the caster fork. The second part may be capable of rotating fully around the caster pivot axis. The compression spring may be a coil spring, a flat spring or a bulk material spring.

Some embodiments of this disclosure may include an autonomous vehicle (AV) that navigates one or more surfaces. The AV includes a container base with a controller, a camera having a field of view and a power base configured to move the container base across the one or more surfaces. The power base includes a base structure including a second controller, two clusters disposed laterally on each side of a base and connected to the base. Each cluster has a front wheel and a back wheel. The power base also includes two casters, each caster connected a caster arm with a caster mount, and the caster arms mounted to each side of the base. The casters are disposed partially within the camera's field of view. The caster mount comprise a centering device that urges the casters to a predetermined orientation when the casters are not in contact with the one or more surfaces.

In some embodiments, the centering device includes a first part mounted to the caster arm, a second part rotatably mounted within the first part and a spring actuator configured to apply a force on the second part. The second part rotates about a castor pivot axis and has a rotational position and a design position with respect to the first part. The spring actuator applies a force on the second part that increases with the angular difference between a rotational position and the design position. The spring actuator includes a compression spring oriented along the castor pivot axis, a swashshaft rigidly attached to the second part and a follower. The swashshaft has a bearing surface defined in part by a swashshaft axis that intersects the caster pivot axis at an acute angle, the bearing surface being centered on the swashshaft axis. The follower contacts the bearing surface and the compression spring. The follower is driven by the swashshaft and progressively compress the compression spring as the angular difference increases.

In one embodiment of the AD, the follower is rotatably connected to the first part via a pin, the pin being perpendicular to the castor pivot axis. In another embodiment of the AD, the follower is allowed to move axially and constrained from rotating about the caster pivot axis.

In some embodiments of the AD, the second part includes a kingpin rigidly attached to the swashshaft.

In some embodiments of the AD the swashshaft includes a fixed portion attached to the second part and a bearing portion that includes the bearing surface. The bearing portion may be a roller element bearing with an outer race.

BRIEF DESCRIPTION OF THE DRAWINGS

The present teachings will be more readily understood by reference to the following description, taken with the accompanying drawings, in which:

FIG. 1 is an isometric view of the lower portion of an autonomous delivery vehicle (ADV).

FIGS. 2A-2D are isometric views of the ADV power base.

FIGS. 10A-10C are views of the caster assembly with an alternative follower.

DETAILED DESCRIPTION

Figure 3A:
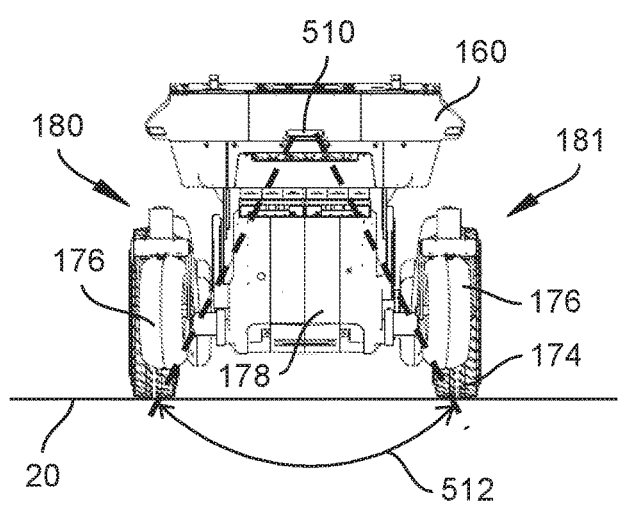
FIGS. 3A-3B are front views of the ADV lower portion.

The autonomous delivery vehicle (ADV) 100 in FIG. 1 may deliver cargo and/or perform other functions involving autonomously navigating to a desired location. In some applications, the ADV 100 of FIG. 1 may be remotely guided. A cargo container (not shown) is mounted on the cargo platform 160, which is mechanically connected to the power base 170. The power base 170 includes four powered wheels 174 and two caster wheels 176. The power base 170 provides speed and directional control to move the ADV 100 along the ground and over obstacles including curbs and other discontinuous surface features.

The cargo platform 160 is connected to the power base 170 through two U-frames 162. Each U-frame 162 is rigidly attached to the structure of the cargo platform 160 and form a rotatable joint 164 at the end of each arm 172 on the power base 170. The power base 170 controls the rotational position of the arms and thus controls the height and attitude of the cargo platform 160. The ADV 100 includes one or more processors to receive data, navigate a path and select the direction and speed of the power base 170. The processors receive data from the short-range sensors 510, 520, 530 in the cargo platform 160 and other sensors not shown in FIG. 1.

Figure 4:
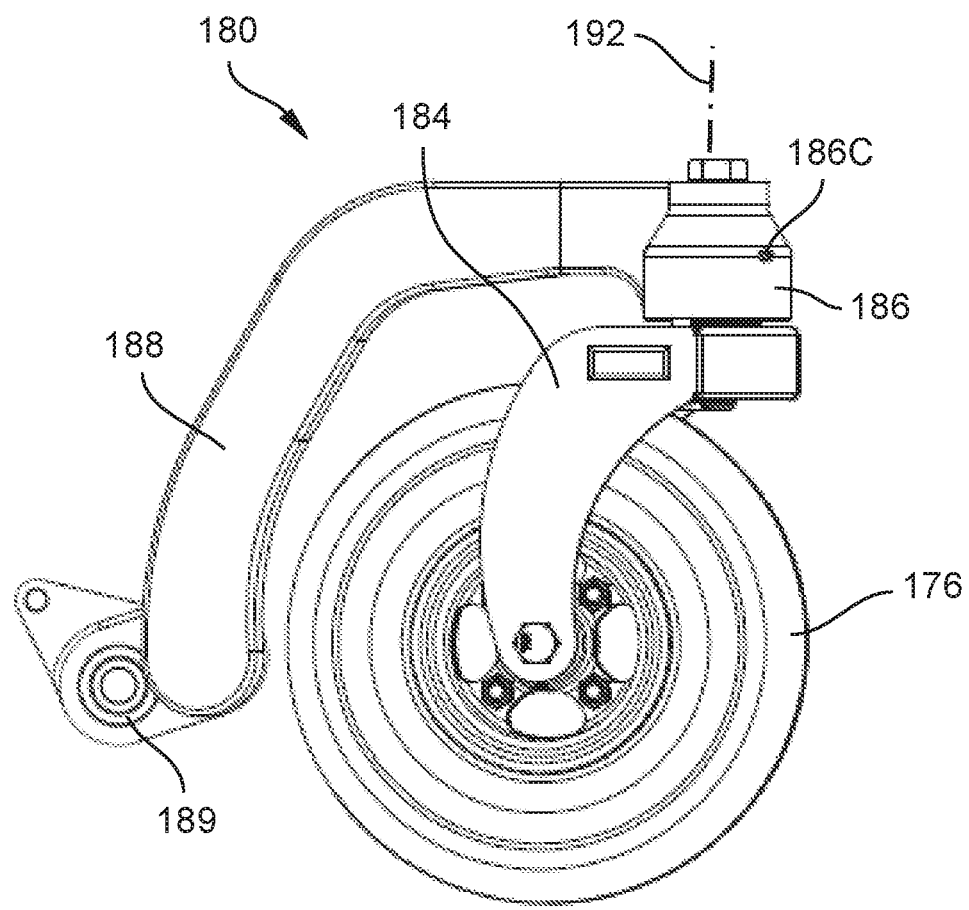
FIG. 4 is a side view of a caster assembly.

The caster assemblies 180, 181 are mounted to the power base body 178. The caster assemblies comprise a left caster assembly 181 and a right caster assembly 180. Referring now to FIG. 4, each caster assembly 180 comprises a caster wheel 176, a caster frame 184, a caster pivot 186, a caster arm 188 and a mounting element 189. The caster wheel 176 is rotatably mounted in the caster frame 184. The caster frame 184 is attached to the caster arm 188 via the caster pivot 186 which allows the caster frame 184 and caster wheel 176 pivot about the caster pivot axis 192. Allowing the caster wheel 176 to pivot about the axis of the caster pivot axis 192 facilitates the wheel 176 aligning with the direction of travel, when the caster wheel 176 is in contact with the ground.

Referring now to FIGS. 2A-2D, the power base 170 can operate in at least two configurations or modes. In standard mode, depicted in FIGS. 2A-2B, the front of the clusters 175 are rotated upward to lift the front wheel 174A off the ground 20. The clusters 175 comprise a driven front wheel 174A and a driven back wheel 174B. The cluster 175 rotates about hub 176 which connects the cluster 175 to the power base body 178. Rotating the front of the cluster up, brings the caster wheels 176 in contact with the ground 20 so the power base 170 and the ADV 100 rest on the back powered wheels 175B and the caster wheels 176. In standard mode, contact with the ground and motion of the power base 170 cause caster frame 184 and wheel 176 to align with the direction of motion.

In four-wheel model, depicted in FIGS. 2C-2D, the clusters 175 are rotated to put both the front 174A and back powered wheels 174B on the ground 20 and lift the caster assemblies 180, 181 off the ground. In four-wheel mode, the caster assemblies 180, 181 are tilted back so that the rotation axis of the pivot 192 tilts backward from a vertical axis 196. The pivot plane defined by the caster pivot axis 192 and the vertical axis 196 is parallel to the centerline of the power base. In four-wheel mode, the backward tilt of the pivot axis 192, alignment of the pivot plane, and gravity also cause the caster wheel 176 align with the centerline of the power base body 178. However, the caster frames 184 and the caster wheel 176 may swing or rotate about caster pivot axis 192 in response to motion of the ADV 100.

Figure 3B:
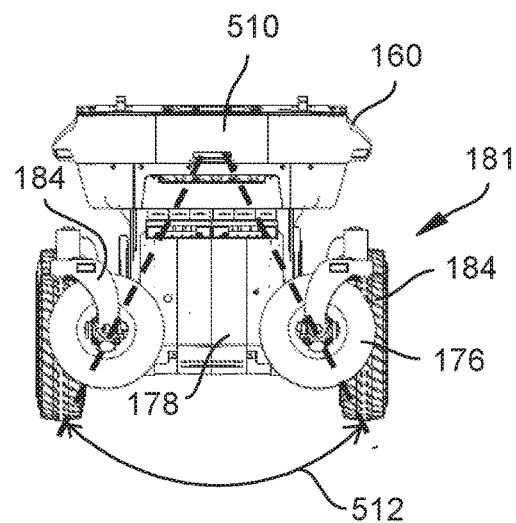

Referring now to FIGS. 3A, 3B, the swinging motion of the caster frame and wheel 184, 176 may interfere with the field of view (FOV) 512 of the forward looking sensors including sensor 510. Movement of the caster wheels within the FOV 512 of the sensors may interfere with the detection of obstacles and surface type by obscuring part of the field of view or by moving unpredictably within the field of view. It is beneficial to obstacle detection to minimize the pivoting movement of the caster wheels 176 and to hold the caster wheels in an orientation aligned with the centerline of the power base body 178. Aligning the caster wheels 176 with the power base body 178 has an additional benefit of having the wheels generally pointing in the right direction when the power base 170 transitions back to standard mode. The power base may 170 wobble or move unpredictably if the casters are not approximately aligned with the base when the caster wheels 176 contact the ground 20 as the power base transitions to standard mode.

The design position for each caster is desired rotational position of the caster frame about the pivot axis relative to other parts of the ADV. In an example, the design position aligns the caster frame 184 and wheel 176 with the power base body 178 as shown in FIG. 3A. In an example, the design position aligns the caster frame 184 with the center line of the power base body 179 (FIG. 2B).

Figure 5:
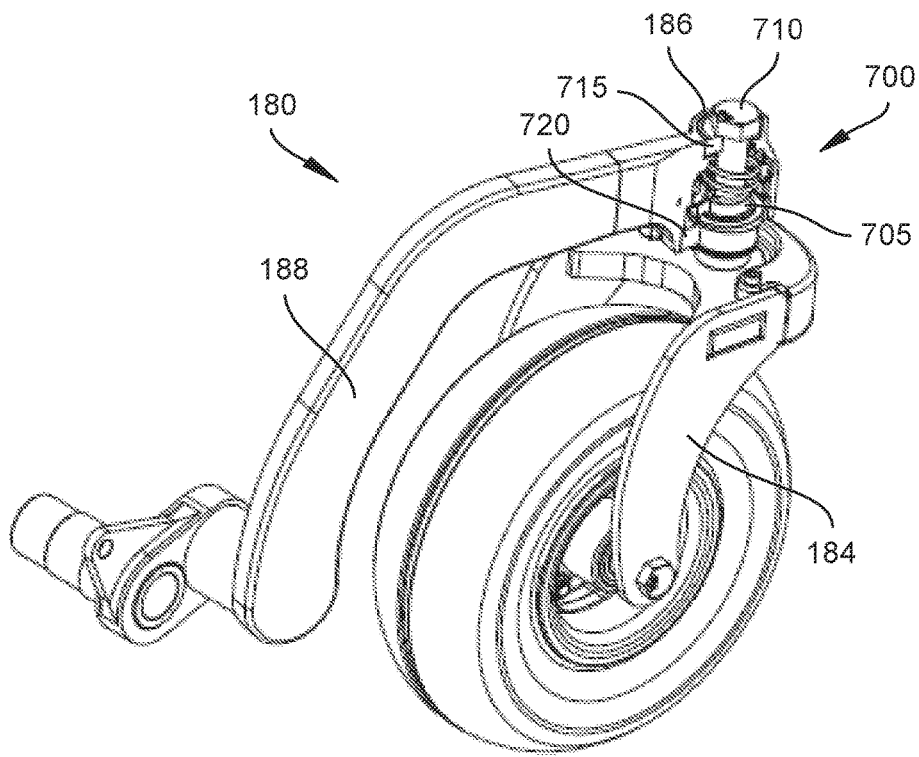
FIG. 5 is an isometric view of a caster assembly.

Referring now FIG. 5, the centering mechanism 700 comprising an actuator 705, a kingpin 710 and bearings 715, 720. The centering mechanism 700 is located in the caster pivot shell 186A. The centering mechanism 700 acts to align the caster frame 184 and wheel 176 with the centerline 179 (FIG. 2D) of the power base body 178. Referring again to FIG. 5, the centering mechanism 700 acts to apply a restoring force to the caster frame 184 when the frame pivots away from a pre-defined design position. In an example, the design position aligns the caster frame and wheel 184, 176 with the power base body. The kingpin 710 is fixedly mounted to the caster frame 184 and rotationally mounted to the caster pivot shell 186A via bearings 715, 720. The kingpin 710 rotates about the caster pivot axis 192. The actuator 705 applies a restoring torque to the kingpin 710 that increases as the kingpin 710, caster frame and wheel 184, 176 rotate further from the design position. In one example, the restoring force is zero when the caster frame 184 and wheel 176 are in the design position. The restoring force reaches a maximum when the caster frame 184 and wheel 176 are opposite or 180 degrees from the design position. If the caster rotates past 180 degrees, the restoring force decreases. Thus the caster frame 184 and wheel 176 will rotate to the design position in the most direct direction rather than retracing its path past the 180 degree position.

Figure 6A:
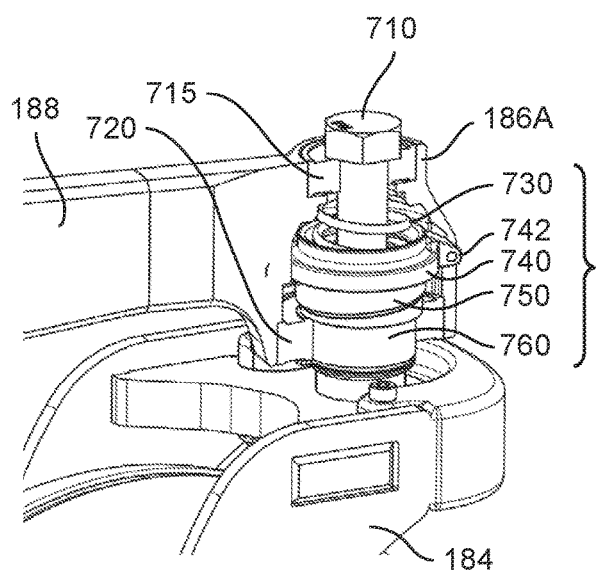
FIGS. 6A, 6B are views of the actuator components.
Figure 6B:
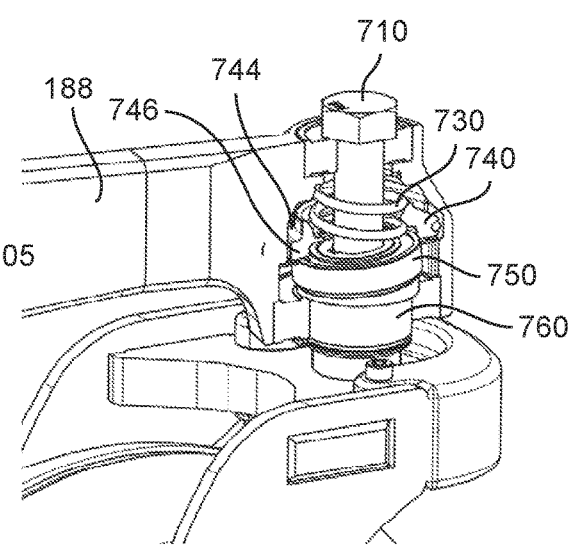

Referring now to FIGS. 6A-6B, the actuator 705 comprises a compression spring 730, a follower 740, a swashshaft bearing 750, and a swashshaft 760. In FIG. 6A, the elements of the actuator 705 are unsectioned. In FIG. 6B, the follower 740 is sectioned. The swashshaft 760 is mounted to the kingpin 710, so that the swashshaft 760 turns with the caster frame 184. The swashshaft 760 may be attached to the kingpin 710 by any method that is well known in the art including but not limited to a key, splines, a set screw, adhesive. Alternatively, the swashshaft 760 may be mechanically connected to the caster frame 184, so the swashshaft 760 turns with the caster frame 184. The swashshaft 760 may be mechanically attached to the caster frame by any method that is well known in the art including but not limited to a pin, a key, splines, screws, adhesive, welding.

Referring now to FIG. 6B, the swashshaft bearing 750 is mounted on the tilted face of the swashshaft 760. The swashshaft bearing 750 contacts the follower 740 at nub 746. The follower 740 contacts and contains one end of the spring 730 on follower groove 744. The compression spring 730 is contained by a shell groove 186B near the top of the pivot shell 186A. The spring 730 applies a downward force on the follower 740 that is transferred to the bearing 750. The bearing 750 may be bronze, oil-impregnated sintered metal, PTFE or other lubricious material that is hard enough to not wear or deform under the load from the follower 740. In one example, the bearing 750 and swashshaft 760 are a single piece. In another example, the bearing 750 is roller bearing where the outer race contacts the follower 740 at nub 746 and the inner race contacts the swashshaft 760. Such a roller bearing would significantly reduce the friction in the actuator 705 and allow the caster frame 184 to freely return to design position. In addition, the low friction of bearing 750 minimizes the spring force required to return caster frame/wheel to the design position and thereby reduce the weight of the actuator 705 and minimize undesirable torque on the casters when the caster wheel is on the ground.

The caster frame 184 and swashshaft 760 are shown in the design position in FIG. 6B. In the neutral position, the spring 730 applies the minimum force on the bearing 750 as the spring 730 is at its maximum extension. In this embodiment, the follower 740 rotates about the follower pivot 742 that comprise a pin that passes through a hole in the follower and mounted in the pivot shell 186A at 186C (FIG. 4). The actuator 705 is in the neutral position when the lowest part of the tilted bearing 750 is furthest from the pin 742, which allows the follower 740 to rotate away from the top of the pivot shell 186A.

The design position of the caster frame 184 is set by the neutral position of the actuator 705. The swashshaft must be properly aligned with the caster frame 184 to match the neutral position of the actuator 705 with the design position of the caster frame 184. In general, the neutral position of the actuator is the position with the lowest applied spring force. In the example pictured in FIGS. 6A, 6B, the neutral position for the actuator 705 has the highest part of the tilted surface on the swashshaft 760 aligned with the follower pivot 742.

Figure 7A:
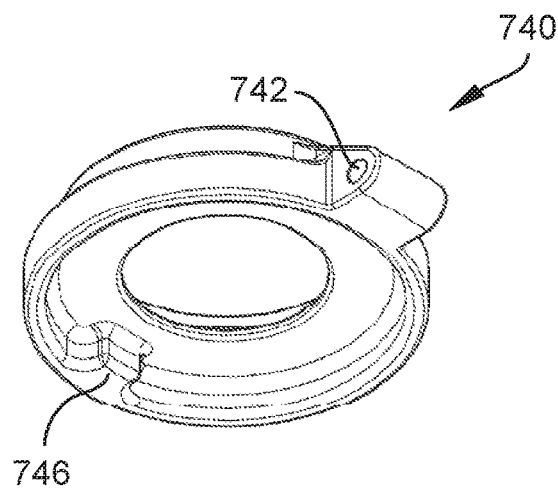
FIGS. 7A-7B are isometric views of the follower
Figure 7B:
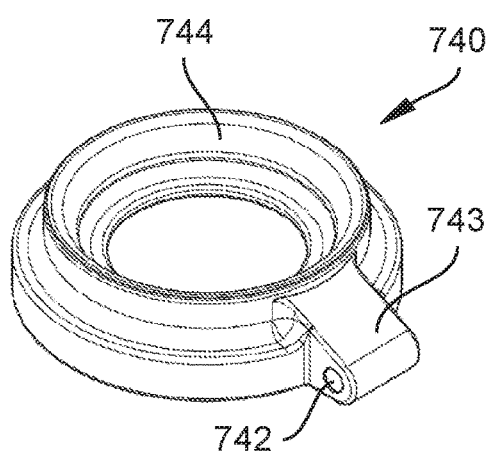

The elements of the follower 740 are more clearly shown in FIGS. 7A and 7B. In this embodiment the follower 740 has an approximate ring shape. An arm 743 extends from the ring and contains the hole for the follower pivot 742. In use, the follower rotates about follower pivot 742. The bottom of the follower 740 includes a protrusion or nub 746 that provides the point of contact to the swashshaft bearing 750 of FIG. 6B.

Figure 8A:
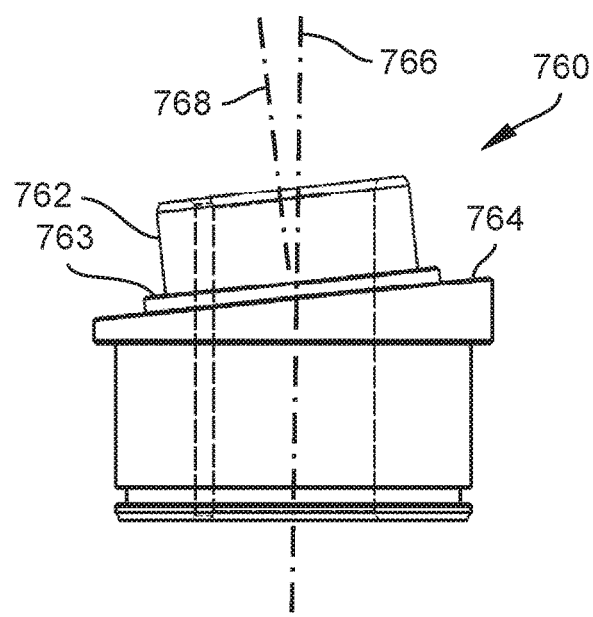
FIGS. 8A-8B are isometric views of the swashshaft.
Figure 8B:
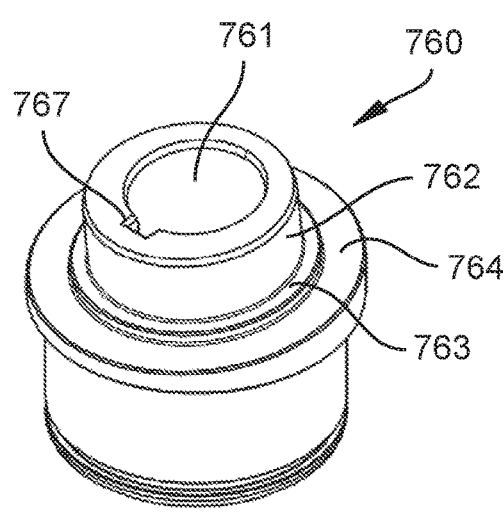

The elements of the swashshaft 750 are more clearly shown in FIGS. 8A and 8B. In this embodiment, the swashshaft 750 comprises a round hole 761 with an shaft axis 766 and swash surface or tilted surface 764. In the centering mechanism 700 (FIG. 6A), the king pin 710 passes through the round hole 761 (FIG. 8B). The tilted surface 764 is perpendicular to swash axis 768. The swash axis 768 intersects shaft axis 766 and defines an acute angle relative to the shaft axis 766. A cylindrical extension 762 provides a mount for the swashshaft bearing 750 of FIG. 6B. Returning to FIG. 8B, step 763 provides a stop for the inner race of a roller bearing 750, so the outer race is free to rotate and minimize friction between the follower 740 and the bearing 750. A keyway 767 may provide a rigid mount between the swashshaft 760 and the kingpin 710.

Figure 9A:
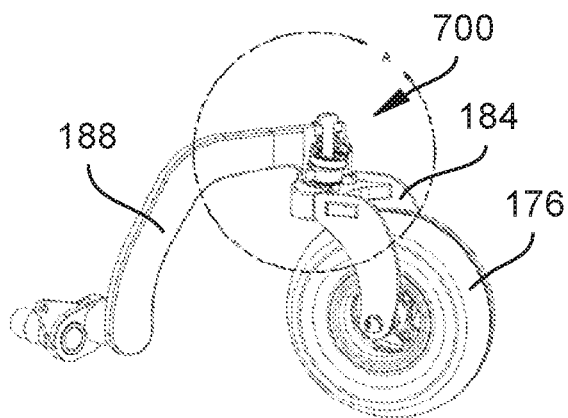
FIGS. 9A-9B are views of the caster assembly
Figure 9B:
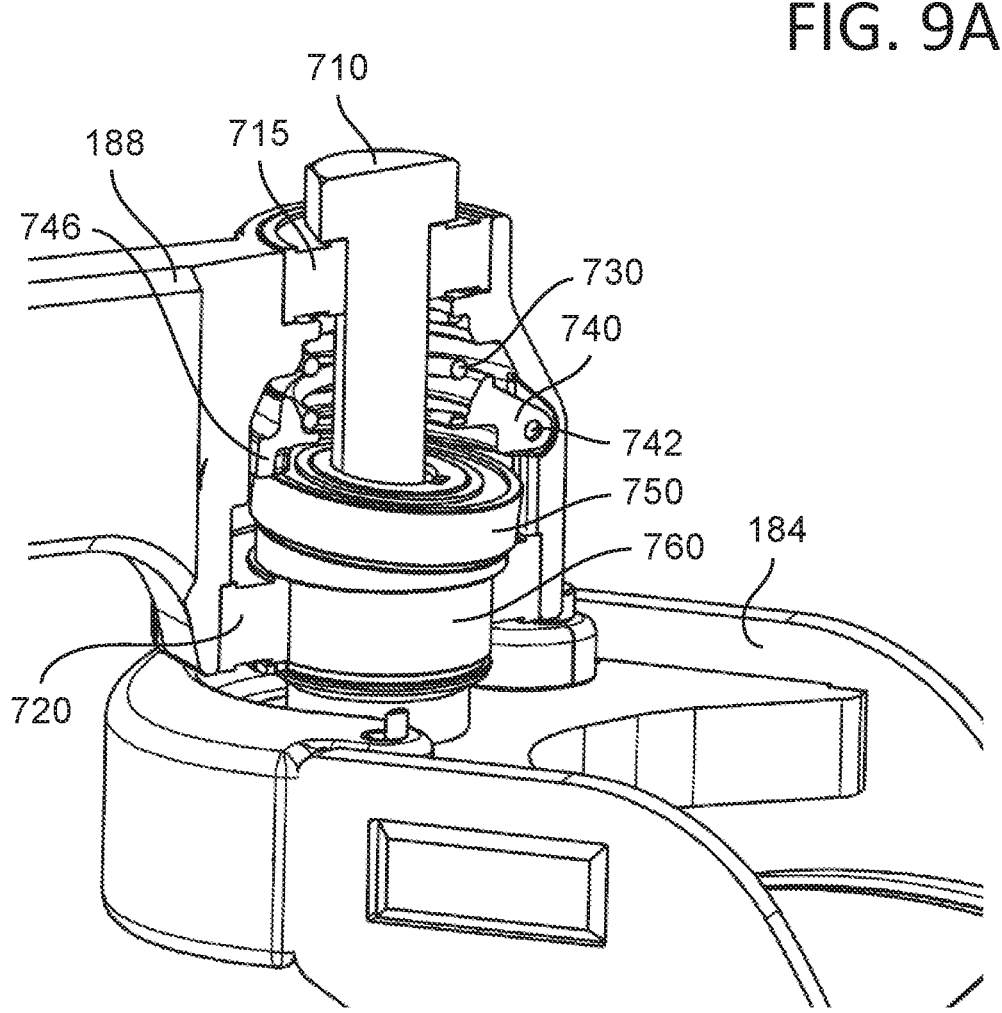

Referring now to FIGS. 9A and 9B, turning the caster frame 184 and wheel 176 away from the design position, compresses the spring 730 and creates a restoring force that pushes the caster frame 184 back toward the design position. In FIG. 9A, the caster frame 184 and wheel 176 has rotated more than 90 degrees from the design position. The cutaway view of FIG. 9B, shows the swashshaft 760 has rotated with the caster frame 184 so that the high point of the bearing 750 is nearly opposite the follower pivot 742. The high point of the bearing 750 lifts up the follower, rotating it about the follower pivot 742 and compressing the spring 730. The increased spring force will tend to push the swashshaft toward the neutral position and thereby push the caster frame back toward the design position.

An alternative follower is show in FIGS. 10A-10C. Referring now to FIG. 10A, the arrangement of the actuator 705 is unchanged. The swashshaft 760 turns with the caster frame 184, which causes the tilted bearing 750 to push the alternative follower 770 upward and compress the spring 730. The alternative follower 770 does not rotate about a pivot pin. The alternative follower 770 moves axially inside the pivot shell 186A. The spring 730 is a compression spring aligned with kingpin 710 and axially contained by the top of the pivot shell 186A and the follower 770.

Referring now to FIGS. 10B, 10C, the alternative follower 770 comprises a groove 774 that contacts and radially constrains one end of the spring 730. The follower surface 772 contacts the bearing 750. The swashshaft 760 and the bearing 750 are in the neutral position in FIG. 10A, where the follower surface 772 is approximately aligned with the tilted surface of the bearing 750. In other examples the follower surface 772 have another angles and may not be planar. The follower surface 772 will always have a section that is axial further from the spring groove 774 and another section that is axially closer to the spring groove 774. The alternative follower 778 includes at least one anti-rotation tab 778 that fits into a slot in the pivot shell 186A and prevents the alternative follower 770 from rotating about the kingpin 710. In one example, the follower has a second rotation tab 778 at an angle of less than 180 degrees from the first tab 778. The two tabs encourage the alternative follower 770 to move axially without rotating about the kingpin 710 or an axis perpendicular to the kingpin 710.

In compliance with the statute, the present teachings have been described in language more or less specific as to structural and methodical features. It is to be understood, however, that the present teachings are not limited to the specific features shown and described, since the means herein disclosed comprise various ways of putting the present teachings into effect. While the present teachings have been described above in terms of specific configurations, it is to be understood that the present teachings are not limited to these disclosed configurations. Many modifications and other configurations will come to mind to those skilled in the art to which these teachings pertain, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached

The invention claimed is:

1. An autonomous delivery vehicle that navigates one or more surfaces, the vehicle comprising:
   a container base including:
      a controller; and
      a camera having a field of view; and
   a power base configured to move the container base across the one or more surfaces, the power base comprising:
      a base structure including a second controller;
      two clusters disposed laterally on each side of a base, each cluster rotatably connected to the base, each cluster including a front wheel and a back wheel; and
      two casters, each caster connected to a caster arm with a caster mount, the caster arms mounted to each side of the base, wherein the casters are disposed partially within the camera's field of view, the caster mount comprise a centering device that urges the casters to a predetermined orientation when the casters are not in contact with the one or more surfaces;
   wherein the centering device comprises:
      a first part mounted to the caster arm;
      a second part rotatably mounted within the first part, the second part rotating about a castor pivot axis and having a rotational position and a design position with respect to the first part; and
      a spring actuator configured to apply a force on the second part, the force increasing with an angular difference between a rotational position and the design position, the spring actuator comprising:
         a compression spring oriented along the castor pivot axis
         a swashshaft rigidly attached to the second part, the swashshaft including a bearing surface defined in part by a swashshaft axis that intersects the caster pivot axis at an acute angle, the bearing surface being centered on the swashshaft axis;
         a follower, the follower contacting the bearing surface and the compression spring, wherein the follower is configured to progressively compress the compression spring as the angular difference increases.

2. The autonomous delivery vehicle of claim 1, wherein the follower is rotatably connected to the first part via a pin, the pin being perpendicular to the castor pivot axis.

3. The autonomous delivery vehicle of claim 1, wherein the follower is allowed to move axially and constrained from rotating about the caster pivot axis.

4. The autonomous delivery vehicle of claim 1, wherein the second part includes a kingpin rigidly attached to the swashshaft.

5. The autonomous delivery vehicle of claim 1, wherein the swashshaft comprises a fixed portion attached to the second part and a bearing portion that includes the bearing suface.

6. The autonomous delivery vehicle of claim 5, wherein the bearing portion is a roller element bearing with an outer race.

7. The caster mount on the vehicle of claim 1, wherein the follower is connected to the first part via a hinge, the hinge having an axis perpendicular to the castor pivot axis.

8. The caster mount on the vehicle of claim 3, wherein the follower has a first surface, surface, the first surface being in contact with the bearing surface, the first surface being perpendicular to the swashshaft axis when the second part is in the design position.

9. The caster mount on the vehicle of claim 1, wherein the design position aligns the caster frame with a centerline of the vehicle base.

10. The caster mount of the vehicle of claim 6, wherein the outer race is the only part of the swashshaft that contacts the follower.

11. The caster mount of the vehicle of claim 1, wherein the second part comprises a caster fork and a caster wheel, the caster wheel rotatably attached to the caster fork.

12. The caster mount of the vehicle of claim 1, wherein the second part is capable of rotating fully around the caster pivot axis.

13. The caster mount of the vehicle of claim 1, wherein the compression spring is one of a coil spring, a flat spring and a bulk material spring.

\* \* \* \* \*